June 10, 1941.  F. R. BICHOWSKY  2,245,455
REFRIGERATING APPARATUS
Original Filed Oct. 29, 1932   4 Sheets-Sheet 1

INVENTOR.
Francis R. Bichowsky
BY Spencer, Hardman & Fehr
ATTORNEYS.

June 10, 1941.  F. R. BICHOWSKY  2,245,455
REFRIGERATING APPARATUS
Original Filed Oct. 29, 1932   4 Sheets-Sheet 3

INVENTOR.
Francis R. Bichowsky
BY Spencer, Hardman & Fisher
ATTORNEYS

Patented June 10, 1941

2,245,455

UNITED STATES PATENT OFFICE 2,245,455

REFRIGERATING APPARATUS

Francis R. Bichowsky, Ann Arbor, Mich., assignor to General Motors Corporation, Dayton, Ohio, a corporation of Delaware Original application October 29, 1932, Serial No. 640,228. Divided and this application January 7, 1938, Serial No. 183,875

2 Claims. (Cl. 62—6)

This invention relates to refrigeration, heating and air conditioning.

This application is a division of my copending application Serial No. 640,228, filed October 29, 1932, now Patent No. 2,212,852, dated Aug. 27, 1940.

It is among the objects of this invention to provide refrigerating, heating and air conditioning apparatus capable of maintaining the desired effective temperatures in dwellings, theatres and other places occupied by human beings, the operation of these apparatus being automatic in so far as controls are used for controlling part or all of the functions of the apparatus to maintain the air at the desired effective temperature.

Further objects and advantages of the present invention will be apparent from the following description, reference being had to the accompanying drawings, wherein a preferred form of the present invention is clearly shown.

Figure 6:
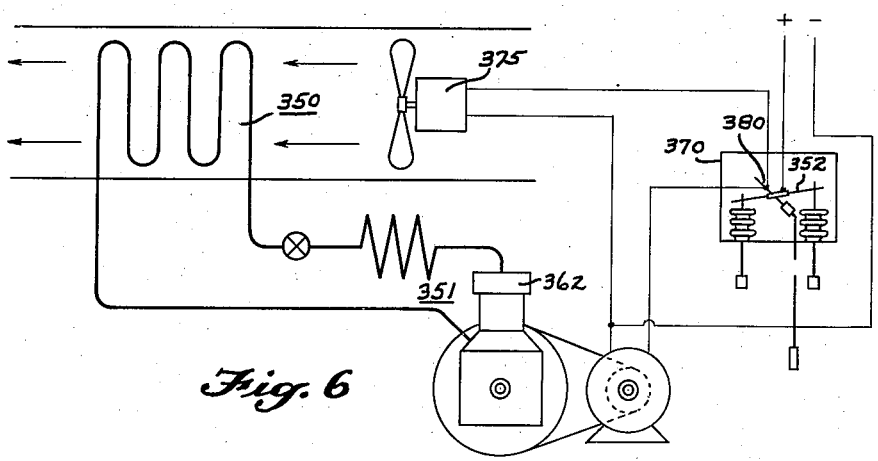
Figure 7:
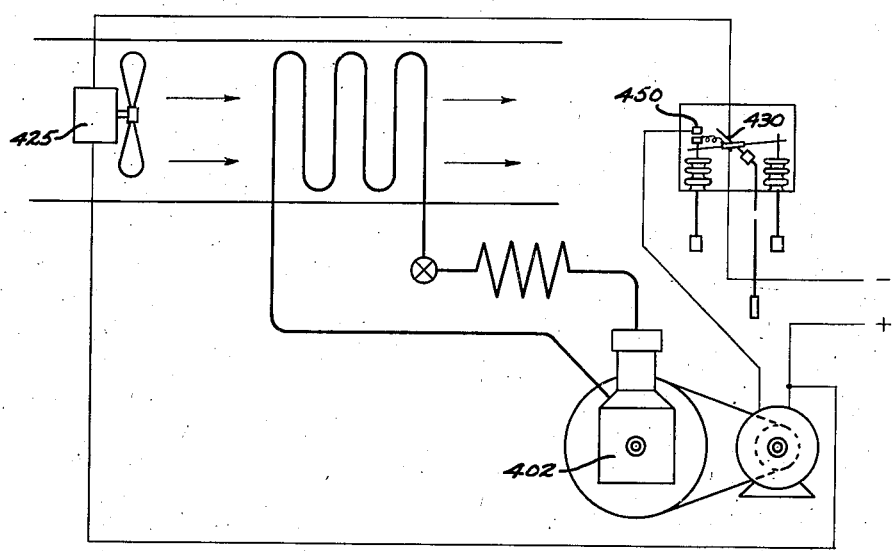

Fig. 6 is a diagrammatic showing of an apparatus in which the control is effective on the temperature of a cooling surface and on the air flow functions of the apparatus; and Fig. 7 is a diagrammatic showing of an apparatus in which the control is effective on the cooling surface and air flow functions of the apparatus and in which the control is also responsive to wet bulb conditions as well as to effective temperature.

In air conditioning, as applied for human comfort, the usual methods of controlling the temperature and humidity of the air in dwellings and places of human occupancy, has been such as to maintain in an enclosure, air of a definite fixed temperature and humidity. Recent investigations on the conditions of air necessary for human comfort, indicate that such a method of controlling is undesirable. It is now well known that the desirable condition for human comfort in a dwelling, or any other place of human occupancy, is to maintain the air at an effective temperature, which varies with the outside temperature.

By an effective temperature, I mean, as is usual in this art, the combination of state of humidity and temperature as given by the well-known table, such as those published by the American Society of Heating and Ventilating Engineers, it being a characteristic feature of the effective temperatures as defined by the relation of temperature and humidity as given in this table, that the effective temperature measures the sensation of hotness or coldness, relative to the human body by the average observer.

The relationship between the wet bulb, dry bulb and effective temperatures will be more fully discussed with reference to Figs. 1 and 2 hereafter.

In general therefore, it is desirable in the control of the temperatures and humidities used in air conditioning, to maintain neither a constant temperature nor a constant humidity but to maintain the relationship between temperature and humidity, such that the space of occupancy is kept at a constant effective temperature.

It has been in the past, impossible to accomplish this in any automatic manner because of the lack of any control apparatus respondent to that combination of conditions of temperature and humidity which constitute effective temperatures.

In the invention as herein specified, I accomplish the control of the temperature and humidity of the air in such a way as to maintain the desirable relationship between temperature and humidity, which corresponds to maintaining the air at a constant effective temperature.

In general, the means which I employ to this end are the coupling together of a temperature respondent device and a device respondent to the relative humidity or to any property of the air which is determined by the relative humidity of the air, either independent of the absolute temperature of the air or as related to the absolute temperature of the air. For example, I may employ in place of a device responsive to the relative humidity; a device responsive to the wet bulb temperature of the air; a device responsive to the dew point of the air. Various means may be employed under this invention of, say, connecting the two devices—one responsive to the temperature of the air and the other responsive directly or indirectly to the humidity of the air in such a way that the joined induction of these two devices will indicate the effective temperature of the air.

Figure 1:
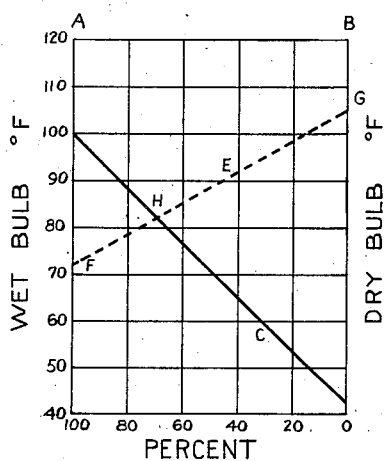
Fig. 1 is a chart indicating the relationship between dry bulb, wet bulb and effective temperatures.

I am well aware of the fact that the relationship between temperature and humidity, defining the effective temperature, is not the same at different effective temperatures, but for the purpose of conditioning air for comfort, the desirable region of effective temperature resides around the effective temperatures of about from 65° to 75°, and in this region of effective temperature, the relationship between temperature and humidity, for example, as indicated in Fig. 1, is essentially linear and of constant slope. This fact makes it possible, by restricting the application of the device to this region and neighboring regions to so couple the device that a motion of the temperature sensitive element, taken in conjunction with a motion of an element whose motion is linearly proportional to the relative humidity, may be coupled in such a way as to produce an element, whose motion will be proportional to the effective temperature. This element being used to actuate a device, whereby directly or indirectly, the condition of the air may be controlled so as to maintain essentially constant effective temperature of this air. Or under this invention, any device respondent to effective temperature may be used to control the temperature and humidity of the air in such relation that their effective temperature remains constant.

It is, in general, necessary for comfort to maintain the effective temperature at a predetermined value, it is desirable in places in which persons are entering or leaving to vary the effective temperature desired in accordance with the outside temperature and for that reason it is desirable in any means controlling air conditioning apparatus to provide means of varying the control temperature in accordance with the external temperature as well as the effective temperature.

In the description I will first describe means of maintaining an effective temperature, it being understood that the effective temperature desired will depend also on the outside temperature.

The various means known in the art for conditioning air differ in the manner in which a desirable condition of temperature and humidity are maintained. In the usual means of producing cold and dry air, as employed in the art, it is usual to contact that air with a cold fluid, which at the same time cools the air and dries it. The relation of temperature and humidity of the air as so conditioned, is fixed by the relation of aqueous tension to temperature of the contacting liquid.

With the apparatus employing this means of conditioning air, it is not most desirable to control the humidity in such a way as to keep a constant humidity or to control temperature in such a way as to keep the constant temperature, but it is desirable to control the temperature of the cooling medium or the concentration of the cooling medium if the medium is an aqueous solution in such a way that the resultant air will have a controlled effective temperature.

I accomplish this by introducing into the air, whose effective temperature it is desirable to maintain constant, a device such as described above, responsive to effective temperature, the controls on such device actuating a means for controlling either the quantity of the contacting liquid exposed; the quantity of air placed in contact with the liquid, the temperature of the liquid placed in contact with the air, or the concentration of the liquid, if the liquid is a solution.

In other means of conditioning air for comfort, as known in the art, the air is cooled out of contact with a liquid to such a temperature that a portion of the moisture in the air is precipitated on the cold surface exposed to the air. When this means of air conditioning is employed, it is desirable to maintain the effective temperature at a predetermined value. I do this by putting in contact with the air a device responsive to the effective temperature of the air, such a device actuating a valve or switch or other means controlling either the temperature of the cooled surface in contact with the air, the quantity of air passed over a said surface or the amount of surface exposed to the air.

Another class of devices for conditioning air, known to the art, separate the process of drying the air and cooling the air, so that by changing the devices governing the drying and cooling, it is possible to independently control the humidity of the air or the temperature of the air.

According to my invention, the air may be brought and maintained at a desired effective temperature, either by controlling the temperature of the air or by controlling the humidity, or the relation of the temperature to humidity may be kept at any desirable relation by suitable interconnection between the valves or other devices controlling the amount of drying accomplished and the valves or other devices controlling the temperature of the air.

Having specified my invention in general, I proceed to describe more in detail one embodiment of the invention, it being understood that any other embodiments falling within the scope of the invention may be used in place of those herein described.

In Fig. 1 the line B is a scale indicating dry bulb temperature, the line A is a scale indicating wet bulb temperature and the line C is a scale indicating effective temperature. In all of these scales, the numerical values are equal vertically, that is, all points on these scales which are equally distant vertically from a common horizontal base line have the same numerical values. Thus, if a wet bulb thermometer is placed adjacent the line A and a dry bulb thermometer adjacent the line B of proper calibration so that each thermometer indicates correctly on its corresponding scale, these thermometers would indicate the same numerical temperature only when air has 100% relative humidity. The line C is so constructed that it intersects the line B at approximately the 42° F. point and intersects the line A at approximately the 100° F. point, the line C being, for the purpose of this invention, a straight line between these two points. In order to indicate the effective temperature prevailing at any particular time, it is only necessary to construct a variable line E starting from the point F which corresponds to the indicated wet bulb temperature and extending to the point G which corresponds to the indicated dry bulb temperature. The intersection of the line E with the line C at the point H gives the effective temperature prevailing in the atmosphere being investigated. Thus the line E is a variable line which follows the dry bulb temperature at one end and the wet temperature at the other end, and indicates, at its intersection with the line C at the point H the effective temperature.

Figure 2:
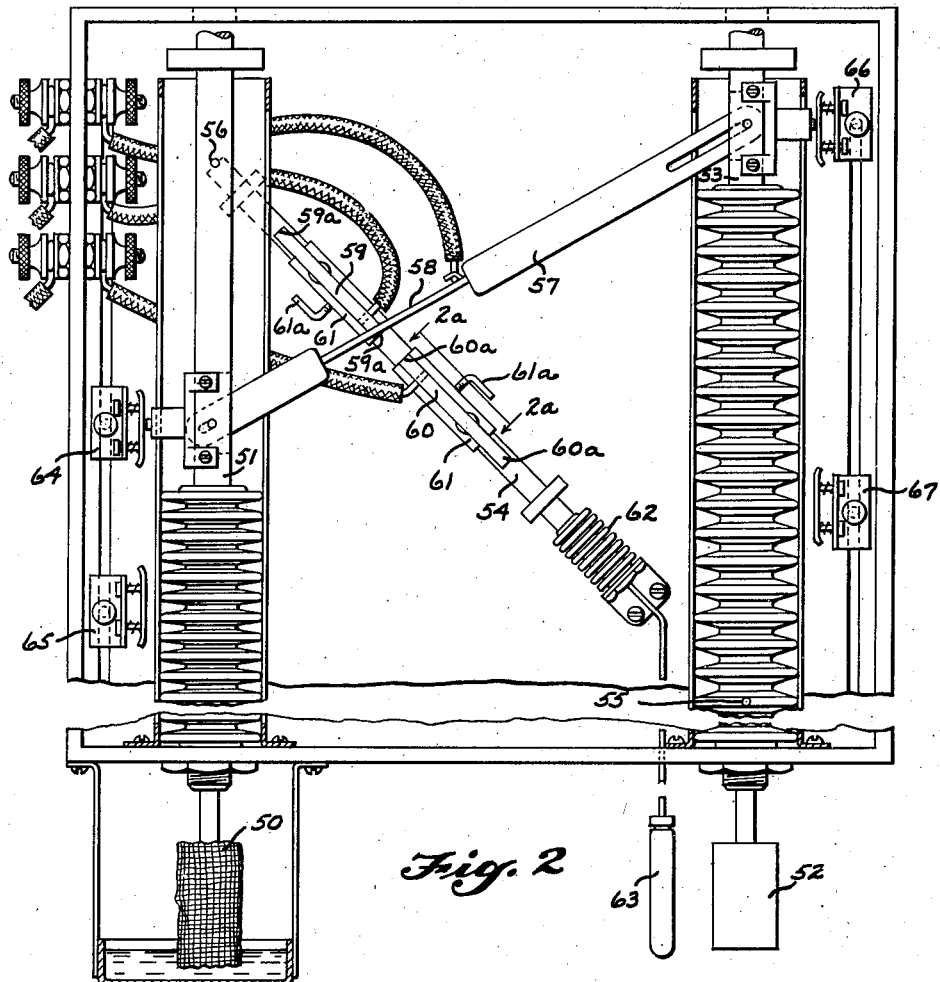
Fig. 2 is a plan view, somewhat diagrammatic, of a control adapted to control the functions of air conditioning apparatus in accordance with the effective temperature, and, if desired, also the dry bulb or wet bulb temperatures or both.
Figure 2A:
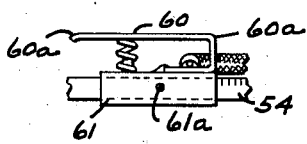
Fig. 2a is a cross sectional view taken along the line 2a—2a of Fig. 2.

Fig. 2 shows a device by which it is possible to control the effective temperature of a space either to a constant value or to a value which depends on the outside temperature and at the same time control either the wet bulb or dry bulb temperature of the air conditioned by the system.

The device shown in Fig. 2 is constructed with a definite relation to the chart shown in Fig. 1. Thus, a wet bulb 50 is provided to create a linear motion on the shaft 51 corresponding to the wet bulb temperatures indicated on the line A of Fig. 1. The dry bulb 52 is constructed to create a linear motion on the shaft 53 corresponding to the dry bulb temperatures of line B, Fig. 1. Scale 54 is placed on the device so as to correspond to line C of Fig. 1. The point 55 corresponds to the point occupied by the indicator on shaft 53 when the dry bulb temperature is 42° and the point 56 corresponds to the point occupied by the indicator on shaft 51 when the wet bulb temperature is 100°. A lever 57 is freely pivoted on the shafts 51 and 53 to produce a line corresponding to the line E of Fig. 1, so that the controlling edge 58 of the lever 57 indicates on the scale 54 the effective temperatures corresponding to the point H of Fig. 1. If desired, upwardly resilient contacts or controls 59 and 60 having sloping ends 59a and 60a are placed on the scale 54 to operate various air conditioning apparatus in a manner hereafter more fully described, and these points 59 and 60 may be mounted on carriages 61 adjustably sliding on the scale 54 and held in adjusted position by thumb screws 61a, so that the carriages 61 may be manually set at any desired point to vary the position of the contacts 59 and 60, or the carriages may be operated by a bellows 62 connected to a thermostatic bulb 63 placed outside of the building, so that the contacts 59 and 60 may be adjusted in accordance with outside temperatures. The contacts 59 and 60 permit the edge 58 to pass over them, but maintain electrical contact as long as the edge 58 is over them. In addition, other contacts such as 64 and 65 may be placed in the path of movement of the shaft 51, these contacts controlling portions of the air conditioning apparatus in accordance with wet bulb temperatures; and other contacts 66 and 67 may be placed in the path of shaft 53 to control portions of air conditioning apparatus in accordance with dry bulb temperatures. The contacts 64, 65, 66 and 67 are mounted in slots as shown in Fig. 2 so that their position relative to the cooperating contacts may be adjusted.

By virtue of the above described angular relationship of the slides 51 and 53 and the lever 57, a unit change in the wet bulb temperature exerts a greater influence at higher dry bulb temperatures than at lower dry bulb temperatures. Referring to Fig. 2, it will be noted that at high dry bulb temperatures movement of the slide 51 causes the lever 57 to pivot about a point which is further away from the contacts 59 and 60 than at low dry bulb temperatures.

Figure 3:
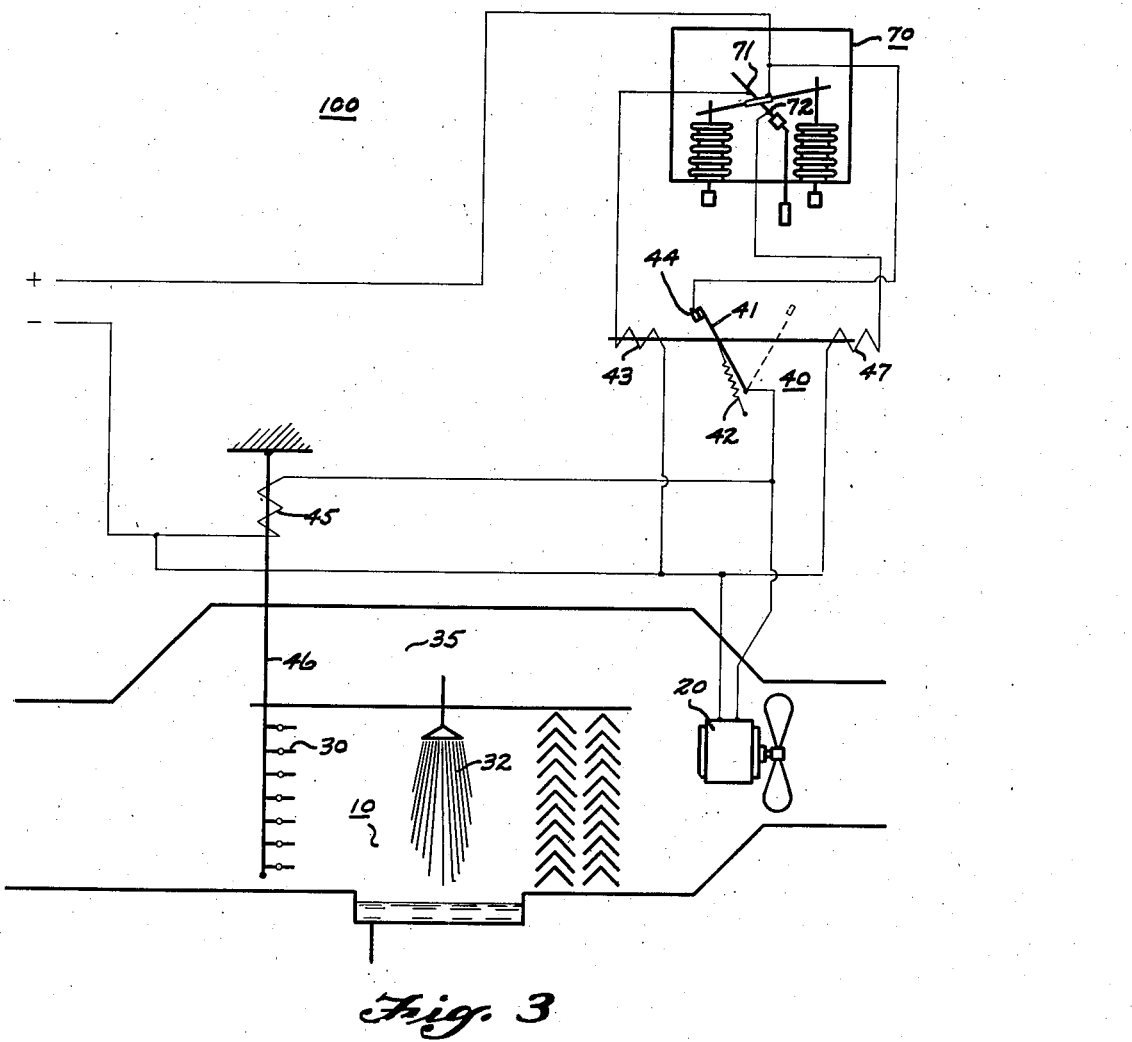
Fig. 3 is a diagrammatic showing of an apparatus in which the control is based on the effective temperature and the control operates on the air flow functions of the apparatus.

Fig. 3 shows a system for controlling the operation of an air conditioning system in which the temperature and humidity are jointly controlled by spraying a portion of the circulated air with cold water in the spraying chamber 10. Such systems may be advantageously controlled to give a constant effective temperature either by controlling the amount of air circulated through the spraying chamber or, as illustrated hereafter, by controlling the temperature of the spray. In Fig. 3 the effective temperature responsive device, described above, which will be for convenience called an etostat 70, is placed in the space to be conditioned 100. Connections are so arranged between the etostat and the fan 20 so that as the effective temperature reaches a value above that indicated by the position of the contact 71, the flow of the air stream will be increased by starting or increasing the speed of the fan 20 which may supplement another fan, not shown, while if the effective temperature reaches a value below that indicated by the contact 72 the flow of air will be decreased by stopping or slowing up the fan 20. The shutters 30 may be arranged to control the amount of air passing through the chamber 10 or the ratio of air passing through the chamber 10 and the by-pass 35. Thus when the contact 71 is closed the shutters are moved by the solenoid 45 to increase the flow of air on contact with the dehumidifying or cooling spray 32, and when the contact 72 is closed the shutters 30 are moved to decrease the flow of air in contact with the spray 32. This may be accomplished by a snap acting relay 40 such that when the contact 71 is closed, the lever 41, under the tension of spring 42 is pulled by the solenoid 43 to close the contacts 44 thus starting the motor 20 and/or causing the solenoid 45 to pull up the rod 46 and open the shutter 30. When the contact 72 is closed the solenoid 47 pulls the rod 41 to the right thus opening contacts 44, stopping motor 20 and dropping rod 46 to close shutters 30. The control of the fan 20 may be used with the control of the shutters 30, or either the fan or shutter control may be used alone.

Figure 4:
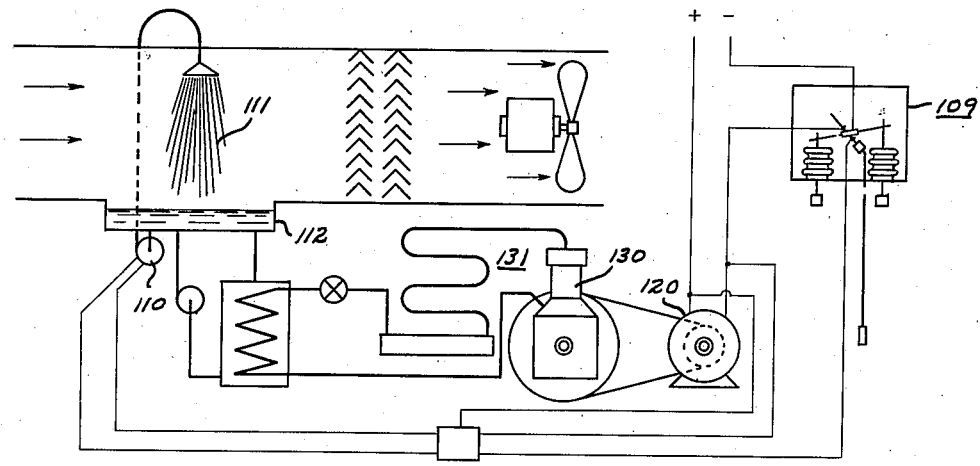
Fig. 4 is a diagrammatic showing of an apparatus, somewhat similar to Fig. 3, but in which the control is effective on the liquid temperature functions of the apparatus.

In Fig. 4, the etostat 109 may be used to control the effective temperature of the space by controlling the temperature or amount of the circulated water sprayed. Thus the amount of water circulated is controlled by turning off or turning on the pump 110, which supplies liquid to the spray 111 from the sump 112, in accordance with the effective temperature. The temperature of the liquid sprayed may be controlled in accordance with the effective temperature by controlling the cooling means for the water in the sump 112, for example, by turning off or turning on the motor 120 driving the compressor 130 of the refrigerating system 131 which cools the water being circulated to and from the sump 112. The control of either the pump 110 or the motor 120 may be used alone or with the other, so that the amount of water sprayed alone may be regulated, or its temperature alone may be regulated, or both the amount and temperature may be regulated.

Figure 5:
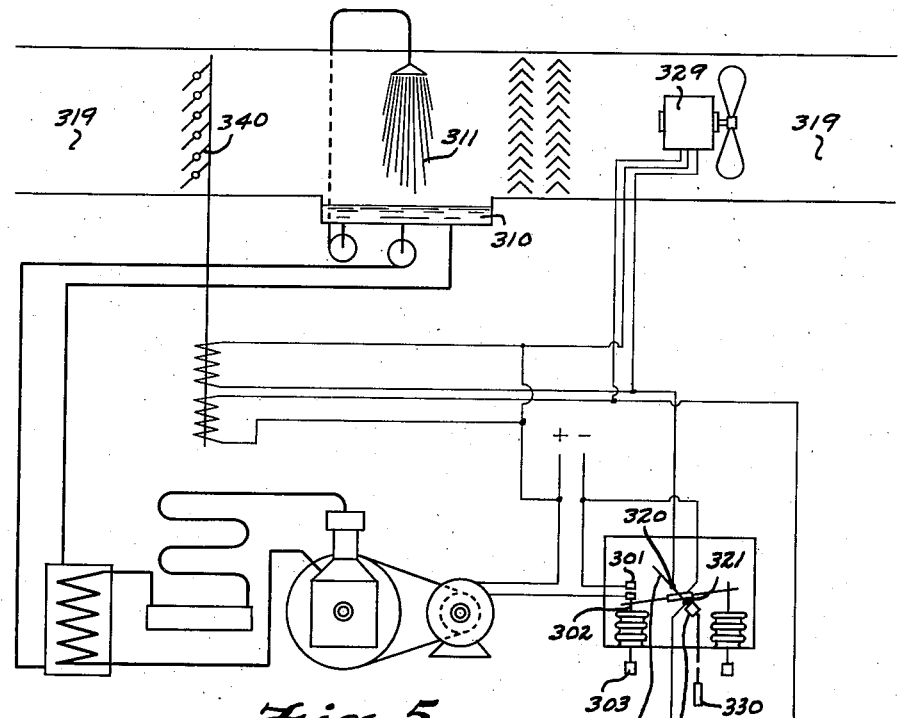
Fig. 5 is a diagrammatic showing of an apparatus in which the control is effective both on the air flow and liquid temperature functions of the apparatus, and in which the control device may also be modified in accordance with outside temperatures.

It may sometimes be desirable to maintain the humidity below a certain point and at the same time keep the effective temperature constant. By arranging a contact 301 (Fig. 5) in such a position that when the wet bulb, as indicated by the motion of the arm of the lever 302 nearest the wet bulb 303, reaches a predetermined value, the contact will be made and connecting said contact so that as the wet bulb temperature exceeds a certain amount, the motor driving the refrigerating system will be turned on and as the wet bulb temperature falls below a certain amount, the motor or other driving means allowing the operation of the refrigerating system is turned off. Thus it is possible to maintain the temperature of the circulating water in the sump 310 and in the spray 311 at such a value that the air entering the enclosure 319 is kept at a constant wet bulb temperature. At the same time the effective temperature may be controlled by connecting the contacts 320 and 321 to the fan 329 or to the shutters 340 as previously described with respect to Fig. 3 so that the fan will be increased in speed or decreased in speed and/or so that the shutters will be opened or closed in accordance with the effective temperature to maintain at the same time the effective temperature at a constant selected value or at a value varied in accordance with outside conditions. If the effective temperature is to be varied in accordance with outside conditions, the contacts 320 and 321 may be adjusted along the slideway 322 by the bellows 323 which is connected to the thermostatic bulb 330 outside the building, so that the effective temperature is maintained at a higher value when the outside temperature rises. If desired, in lieu of the contact 201, a similar contact may be used at the other side, which contact may be opened and closed in accordance with dry bulb temperatures instead of wet bulb temperatures, the action being similar to that of contacts 66 or 67 of Fig. 2.

In other classes of refrigerating systems, shown diagrammatically in Fig. 6, the air is conditioned by passing over a cooling surface 350. The desirable effective temperature may be maintained by keeping the said cooling surface at the appropriate temperature by means of the etostat 370 placed preferably in the space to be conditioned. Conveniently, this may be done by connecting the contact 380 of the etostat in such a way that as the effective temperature exceeds a predetermined value and the lever 352 makes contact with the contact 380, an electric circuit is made which will turn on the motor operating the refrigerating system 351 controlling the temperature of the cooling surface 350 which may be the evaporator of the system 351 and so arranged that when the effective temperature falls below a predetermined value, which value may or may not be a function of the outside temperature as disclosed in Fig. 5, the electric contact between the lever 352 and the contact 380 is broken, thus stopping or slowing down the compressor 352 or other means furnishing refrigeration to the cooling coil 350. The effective temperature of the space to be conditioned may be controlled by varying the amount of air passing over the cooling coil in accordance with the response of the etostat. Thus when the contact 380 is closed the fan 375 will be started or have its speed increased and when the contact is broken the fan will stop or slow up. Here also, the controls for the compressor 362 and fan 375 may be used together or either alone.

In Fig. 7, it may be desirable to maintain both a selected relative humidity and a selected effective temperature of the conditioned air, which may be accomplished by providing on the etostat an extra contact 450 so arranged that when the wet bulb temperature exceeds a certain amount the compressor 402 will be turned on and when the wet bulb temperature is below a certain value the compressor may be turned off. The effective temperature may be controlled at the same time by connecting the contact 430 in such a way as to control the amount of air passing over the cooling surface by controlling the operation of the fan 425 similarly to the control of fan 325 in Fig. 6. If desired, in lieu of the contact 450, a similar contact may be used at the other side, which contact may be opened and closed in accordance with dry bulb temperatures instead of wet bulb temperatures, the action being similar to that of contacts 66 or 67 of Fig. 2.

In other classes of air conditioning systems, the condition of the air is controlled by the density of a contacting fluid, by the temperature of this fluid, by the amount of air flow and by the temperature of the cooling medium. Systems of this class may be controlled so as to maintain a desired effective temperature by varying in accordance with the indications of the etostat either the amount of air flowing, the temperature of the cooling medium, the amount of conditioning liquid flowing and the density of the conditioning liquid; or any of these may be controlled jointly so as to maintain a constant predetermined wet bulb temperature and a predetermined effective temperature.

Many systems of air conditioning are equally applicable to heating systems alone and to systems which jointly heat and cool. As applied to heating systems, I may either control the temperature of the heating means or the amount of the heating means, this means being either steam, hot air, or hot water, as is usually used in the art; or I can jointly control the effective temperature of the space and at the same time keep the humidity at a predetermined value by so connecting the etostat that as the effective temperature falls below a certain value, the amount of the heating means is increased, while if it falls above a certain value, the amount of the heating means is decreased.

In the case that the air conditioning system is applicable to summer and winter conditions I can arrange the connection to the etostat in such a way that if the effective temperature falls below a certain value, the heating means is turned on and the cooling means turned off, while if it rises above a certain value, the cooling means is turned on and the heating means is turned off.

While the form of embodiment of the present invention as herein disclosed, constitutes a preferred form, it is to be understood that other forms might be adopted, all coming within the scope of the claims which follow.

What is claimed is as follows:

1. Air conditioning apparatus for an enclosure comprising in combination, an evaporator, a compressor and a condenser connected in refrigerant flow relationship, means for operating said compressor, means for effecting a thermal exchange between a stream of air and refrigerant in said evaporator, control mechanism for said apparatus for maintaining the effective temperature in said enclosure within a predetermined comfort zone comprising means responsive to effective temperature for controlling said means for effecting said thermal exchange, said effective temperature responsive means including means responsive to changes in the wet bulb temperature for controlling the operation of said compressor operating means so as to limit the effective temperature within said comfort zone.

2. Air conditioning apparatus for an enclosure comprising in combination an evaporator, refrigerant liquefying means for supplying liquid refrigerant to said evaporator, means for effecting thermal exchange between a stream of air and refrigerant in said evaporator, control mechanism for said apparatus for maintaining the effective temperature in said enclosure within a predetermined comfort zone, said control mechanism comprising means responsive to one function of the effective temperature of air, means responsive to another function of the effective temperature of the air, means responsive to the joint action of the aforesaid means for controlling said means for effecting said thermal exchange and means responsive to one of said functions for controlling said refrigerant liquefying means for limiting said effective temperature within said comfort zone.

FRANCIS R. BICHOWSKY.